US007336388B2

(12) United States Patent
Breton

(10) Patent No.: US 7,336,388 B2
(45) Date of Patent: Feb. 26, 2008

(54) HAND HELD PRINTER CORRELATED TO FILL-OUT TRANSITION PRINT AREAS

(75) Inventor: Alex Breton, Enskede Gård (SE)

(73) Assignee: Xpandium AB, Stockholm (SE)

( * ) Notice: Subject to any disclaimer, the term of this patent is extended or adjusted under 35 U.S.C. 154(b) by 324 days.

(21) Appl. No.: 10/507,491

(22) PCT Filed: Mar. 10, 2003

(86) PCT No.: PCT/SE03/00389

§ 371 (c)(1),
(2), (4) Date: Sep. 8, 2005

(87) PCT Pub. No.: WO03/076196

PCT Pub. Date: Sep. 18, 2003

(65) Prior Publication Data

US 2006/0050131 A1 Mar. 9, 2006

(30) Foreign Application Priority Data

Mar. 11, 2002 (SE) .................................... 0200711

(51) Int. Cl.
*G06F 15/00* (2006.01)
*G06K 1/00* (2006.01)
*G06K 15/00* (2006.01)

(52) U.S. Cl. ....................... 358/1.18; 347/109; 347/40; 347/41; 347/42; 347/43; 400/88; 400/76; 358/1.18

(58) Field of Classification Search ..................... None
See application file for complete search history.

(56) References Cited

U.S. PATENT DOCUMENTS 5,028,934 A * 7/1991 Kasai et al. ................ 347/215
5,593,236 A * 1/1997 Bobry ......................... 400/88
5,644,139 A 7/1997 Allen et al.
5,927,872 A 7/1999 Yamada
6,038,032 A 3/2000 Kokubo
6,062,686 A * 5/2000 Kinoshita et al. ........... 347/109
6,070,962 A * 6/2000 Kinoshita .................... 347/40
6,233,368 B1 5/2001 Badyal et al.
6,338,555 B1 * 1/2002 Hirose ........................ 347/109
6,357,939 B1 3/2002 Baron (Continued)

FOREIGN PATENT DOCUMENTS

WO 0125019 A2 4/2001

(Continued)

*Primary Examiner*—Twyler Lamb
*Assistant Examiner*—Hilina S Kassa
(74) *Attorney, Agent, or Firm*—Nixon & Vanderhye P.C.

(57) ABSTRACT

The invention relates to a hand-held and hand-operated printing device having a print (2) head assembly comprised in a housing (1) for a hand-held and hand-operated printing controlled by a processor (4), and a method therefore. The position of the printing device on a print medium is sensed in relation to pixels to be printed. An image is stored in a memory together with its mutual image pixel coordinate data. Image pixels are printed onto the print medium through nozzles (12) in a print-head array (60) in accordance with the pixel coordinate data during a printing sequence. The image is built-up through sectional printing whereby each section has at least one print area interfacing at least one other print area, said interfacing print areas being correlated to fill-out transition print areas during printing of said sections through at least one transition printing pattern by omitting printing of some pixels in said transition print area.

24 Claims, 8 Drawing Sheets

U.S. PATENT DOCUMENTS

| | | | | |
|---|---|---|---|---|
| 6,916,128 | B1 * | 7/2005 | Petteruti et al. | 400/88 |
| 6,942,335 | B2 * | 9/2005 | Trent | 347/109 |
| 7,108,370 | B2 * | 9/2006 | Breton | 347/109 |
| 7,182,456 | B2 * | 2/2007 | Walling | 347/109 |

FOREIGN PATENT DOCUMENTS

| | | | |
|---|---|---|---|
| WO | 0174598 | A1 | 10/2001 |
| WO | 0194118 | A1 | 12/2001 |

* cited by examiner

HAND HELD PRINTER CORRELATED TO FILL-OUT TRANSITION PRINT AREAS

This application is a U.S. national phase of international application PCT/SE03/00389 filed in English on 10 Mar. 2003, which designated the U.S. PCT/SE03/00389 claims priority to SE Application No. 0200711-0 filed 11 Mar. 2002. The entire contents of these applications are incorporated herein by reference.

TECHNICAL FIELD

The present invention pertains to a hand-operated printing device having a print head assembly for a hand-held and hand-operated printing on a print medium controlled by a processor, and a method therefore, so called Random Movement Printing Technology (RMPT). Specifically it provides enhanced image quality for sectional printing of an image by means of a printing transition pattern.

BACKGROUND ART

Hand-held and hand-operated printing devices with an ink-jet print head are known through various documents.

U.S. Pat. No. 5,927,872 by Yamada discloses a system and a method of printing an image represented by a frame of image data utilizing a hand-held printer having optical sensor means for tracking positions of the hand-held printer relative to the surface of a print medium during a printing process. It is monitored in real time using navigation information generated by the optical sensor.

Each optical sensor comprises an array of opto-electronic elements to capture images of the surface of a print medium at fixed time intervals. Preferably, the optical sensor means can detect slight pattern variations on the print medium, such as paper fibers or illumination pattern formed by highly reflective surface features and shadowed areas between raised surface features. These features can then be used as references for determining the position and the relative movement of the hand-held printer. During the printing process, the hand-held printer can also use the printed portions of the image as reference positions.

In the preferred embodiment, the hand-held printer contains a navigation processor and a printer driver. Using the printer driver, the navigation processor drives the hand-held printer to print segments of the image onto a print medium as the hand-held printer travels across the print medium during a printing process. Each segment of the image is printed onto a particular location on the print medium to form a composite of the image.

In the U.S. Pat. No. 6,233,368 B1 by Badyal et al it is taught a CMOS digital integrated circuit (IC) chip on which an image is captured, digitized, and then processed on-chip in substantially the digital domain.

A preferred embodiment comprises imaging circuitry including a photo cell array for capturing an image and generating a representative analog signal, conversion circuitry including an n-bit successive approximation register (SAR) analog-to-digital converter for converting the analog signal to a corresponding digital signal, filter circuitry including a spatial filter for edge and contrast enhancement of the corresponding image, compression circuitry for reducing the digital signal storage needs, correlation circuitry for processing the digital signal to generate a result surface on which a minima resides representing a best fit image displacement between the captured image and previous images, interpolation circuitry for mapping the result surface into x- and y-coordinates, and an interface with a device using the chip, such as a hand-held scanner.

The filter circuitry, the compression circuitry, the correlation circuitry and the interpolation circuitry are all embodied in an on-chip digital signal processor (DSP). The DSP embodiment allows precise algorithmic processing of the digitized signal with almost infinite hold time, depending on storage capability. The corresponding mathematical computations are thus no longer subject to the vagaries of CMOS chip structure processing analog signals.

Parameters may also be programmed into the DSP's software making the chip tunable, as well as flexible and adaptable for different applications.

U.S. Pat. No. 5,644,139 by Allen et al discloses a scanning device and a method for forming a scanned electronic image including the use of navigation information that is acquired along with image data, and then rectifying the image data based upon the navigation and image information. The navigation information is obtained in frames. The differences between consecutive frames are detected and accumulated, and this accumulated displacement value is representative of a position of the scanning device relative to a reference. The image data is then positioned-tagged using the position data obtained from the accumulated displacement value. To avoid the accumulation of errors, the accumulated displacement value obtained from consecutive frames is updated by comparing a current frame with a much earlier frame stored in memory and using the resulting difference as the displacement from the earlier frame. These larger displacement steps are then accumulated to determine the relative position of the scanning device.

The above documents do only teach how to determine the position in a conceptual generation of navigation information. In this context the U.S. Pat. No. 5,927,872 by Yamada uses the navigation information for a hand-held scanner disclosed in U.S. Pat. No. 5,644,139 by Allen et al. The invention according to Allen et al teaches navigation through comparison of pixels on a frame basis.

A disadvantage with the current handheld printing devices originates from the inaccuracy of the printer-sensors providing positional information to the device as to its positioning on a printing medium. The type of position reading sensors currently utilized in such handheld and hand-operated printing devices have a deviation in accuracy for positioning data of about 0.5-1%, consequentially reducing the quality of image printing since a positional divergence of that magnitude is enough for providing either an overlap or a gap between two subsequently printed sections of an image having sides interfacing each other. The complete image printed in sections utilizing printer-positional information as provided by such sensors will in some intersections therefore be either darkened due to overlapping in part of printed image sections or lightened due to a distancing between the same and the total image impression will thus be considerably impaired.

There is always the possibility that a hand-held printing device at occasions is positioned correctly for a subsequent sectional printout of an image, but this is achieved more by chance and not so much by exact positioning through sensor information.

Accordingly, the lack of predictability for printout quality cannot be satisfactory for the market, from which demands for maintenance of a certain homogeneous and acceptable level of printout quality probably will be put forth as essential requisites for the efficacy and applicability of these devices. By analyzing the state of the art through the above documents and in view of the discussed problem, a need of providing a means for ensuring enhanced and homogeneous quality-printing emerges, which should be accomplished preferably without interfering with the structural smallness of the hand-held printing devices as of current composition.

SUMMARY OF THE DISCLOSED INVENTION

The present invention relates to a hand-operated printing device having a print head assembly for a hand-held and hand-operated printing on a print medium controlled by a processor and a method therefore. One aim of the present invention is to provide enhanced image quality for printouts accomplished by the assembly.

Hence, the present invention sets forth a hand-held and hand-operated random movement-printing device controlled by at least one processor, and having a print head assembly comprised in a housing. Thereby it comprises:

at least one position sensor means, sensing the position of the printing device on a print medium in relation to pixels to be printed;

a memory, storing at least one image with its mutual image pixel coordinate data;

a print-head array provided with nozzles, for printing image pixels onto the print medium in accordance with the pixel coordinate data during a printing sequence; wherein the image being built-up through sectional printing whereby each section has at least one print area interfacing at least one other print area, said interfacing print areas being correlated to fill-out transition print areas during printing of said sections through at least one transition printing pattern by omitting printing of some pixels in said transition print area.

In one embodiment of the present invention, said omitted pixels in said transition area according to said printing pattern are randomly distributed.

One embodiment comprises that said omitted pixels in said transition area according to said printing pattern are distributed according to a mathematical algorithm.

Another embodiment comprises that said omitted pixels in said transition area are distributed according to a pre-stored printing pattern.

A further embodiment comprises that the probability of a pixel being printed within the transition area of an image section is decreasing towards that peripheral side of the transition area facing a side of an image section for subsequent printing.

A still further embodiment comprises that a pixel is printed within the transition area when both the image-pixel and the corresponding pixel of the transition pattern have a value TRUE for printing.

Yet another embodiment comprises that a pixel is omitted within the transition area when one of an image-pixel and the corresponding pixel of the transition pattern have a value FALSE for printing.

A yet further embodiment comprises that a variable range of the outermost positioned nozzles in the array are arranged to provide the transition pattern.

A still further embodiment comprises that the 5-20 outermost positioned nozzles at each end of the array are arranged to provide the transition pattern.

Yet one more embodiment comprises that the transition pattern provides a gradually decreasing probability of pixel printing the further out the nozzles are located at each end of the array.

Yet a further embodiment comprises that an earlier omitted pixel is printed during a re-printing sequence of the same image and an earlier printed pixel is not re-printed.

Yet an embodiment comprises that the print head is of the ink-jet type having nozzle channels, arranged for spraying ink droplets from an associated ink container onto the print medium in accordance with the pixel coordinate data.

Furthermore the present invention sets forth a method for a hand-held and hand-operated random movement-printing device controlled by at least one processor, and having a print head assembly comprised in a housing. It comprises the steps of:

sensing the printing device position on a print medium in relation to pixels to be printed;

storing at least one image with its mutual image pixel coordinate data in a memory;

printing image pixels through nozzles in a print-head array onto the print medium in accordance with the pixel coordinate data during a printing sequence; wherein the image being built-up through sectional printing whereby each section has at least one print area interfacing at least one other print area, said interfacing print areas being correlated to fill-out transition print areas during printing of said sections through at least one transition printing pattern by omitting printing of some pixels in said transition print area.

The method of the present invention is able to perform method steps of the above print device embodiments in accordance with attached method sub-claims.

BRIEF DESCRIPTION OF THE DRAWINGS

Henceforth reference is had to the accompanying drawings for a better understanding of the given examples and embodiments of the present invention, wherein.

DETAILED DESCRIPTION OF PREFERRED EMBODIMENTS

The present invention relates to a handheld and hand operated printing device having a print head assembly and a method therefore, so called Random Movement Printing Technology (RMPT), for sectional printing of an image on a print medium. The printing device and method providing enhanced, homogeneous and to a certain degree predictable printout quality by means of a printing transition pattern utilized in the transition areas between associated section-sides of the printed image. Thereby, a smoothening out of irregularities and discrepancies during printing, due to positional deviation regarding the positioning of the device on the print medium relating to non-exact sensor data to the device, can be achieved without compromising the structural composition of the printing device, i.e. without enlarging it, for example by providing better-quality sensors.

FIG. 1 to FIG. 10 disclose or relate to a handheld printer device as described in the Swedish patent application 0102542-8 by Walling not yet published, which substitutes both the mechanical control of a print-head and forward feeding of a print-out through hand movements on a printing surface. This enables a manufacturing of a printer device, having less width than the actual printout, and a reduction of the total of mechanical components in its construction.

It is designed to provide a compact portable printing device in order to enable a user to print from small portable devices such as a cellular phone, a portable PC, a personal digital assistance (PDA) or the like, and other portable electronic devices or for electronic stamping, printing of small texts, tags, addresses, cutting and clipping.

By fixing a print-head in a construction plate where one or more positioning sensor means are fixed as well, it is possible to obtain a geometrical construction with an x- and y-coordinate system and to establish, with great mathematical accuracy, the coordinates x and y for each individual ink-jet opening/nozzle in the print-head.

The coordinates, during a time frame, constitute the grounds for an accurate and precise spraying of ink-drops onto a printing surface according to a predetermined printing design. Even when the coordinates change over a time period, it is possible to calculate in real time, the changes in direction, speed, acceleration, rotation etc. along the z-axis controlled by a microprocessor. It provides the possibility to adjust the printing-head to spray an even and pre-programmed flow of ink-jet drops into an adjustable and varying flow of ink-jet drops.

Figure 1:
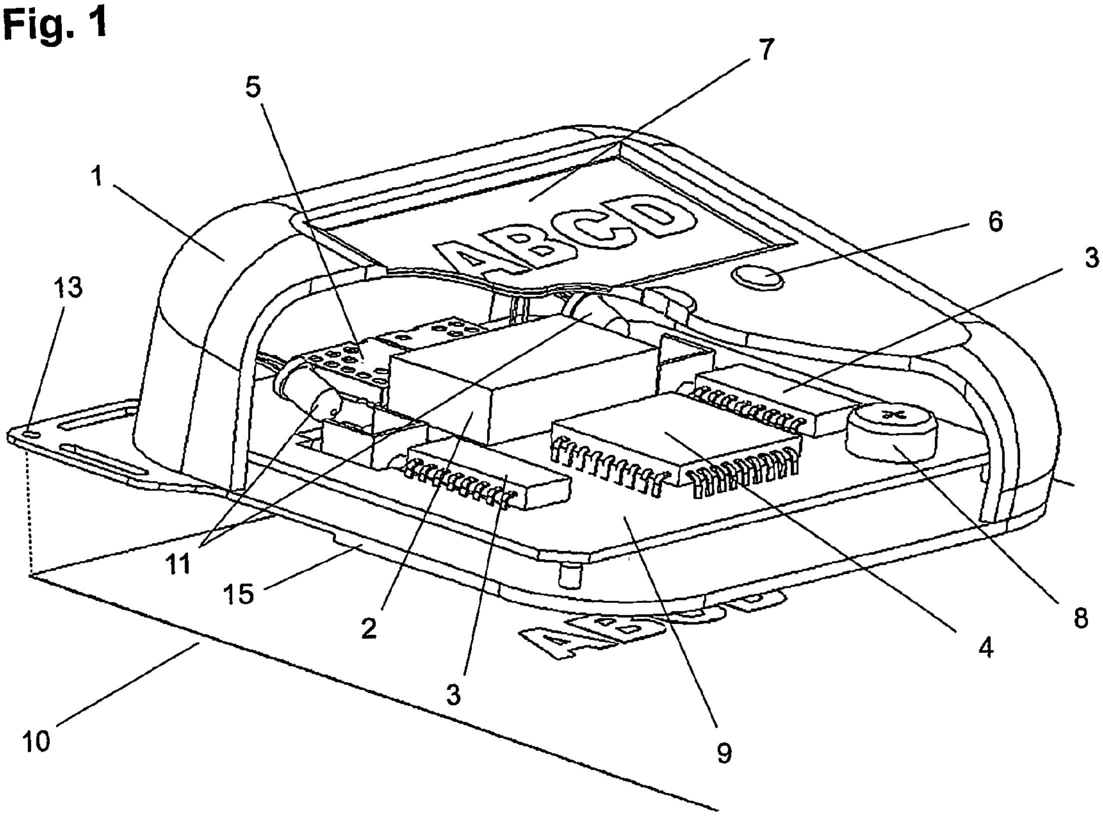
FIG. 1 illustrates a perspective view in section of a printing device that may be used in the present invention.
Figure 2:
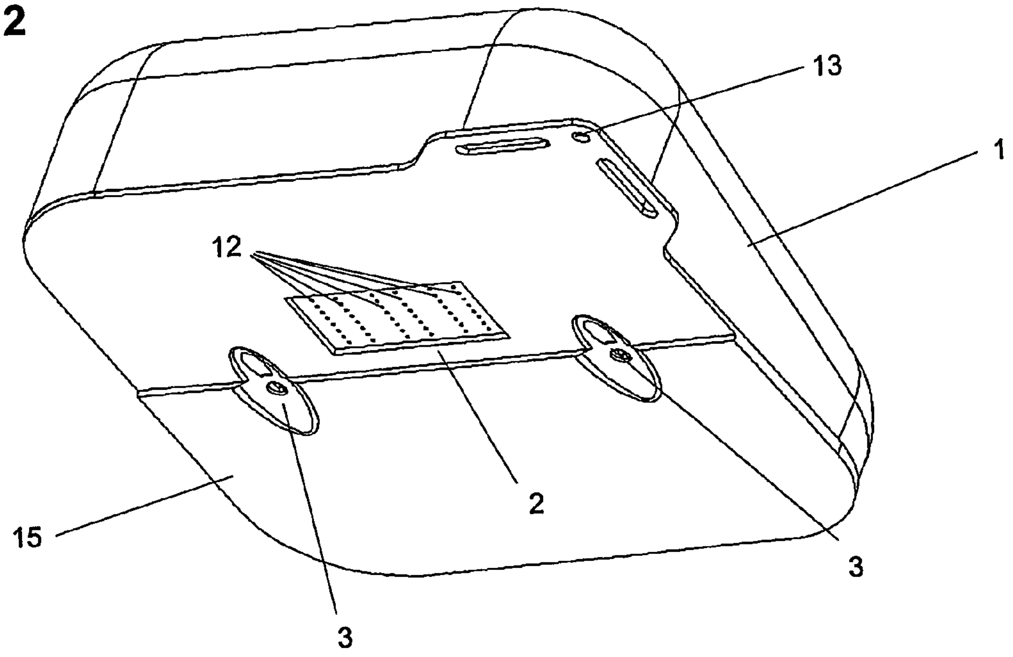
FIG. 2 illustrates a perspective view from underneath of a printing device according to FIG. 1.

FIGS. 1 and 2 illustrate a hand operated printing device composed by a construction/design body 1 and a print-head 2 which interact with one or more optical positioning sensor means 3, a micro controller circuit 4, a communication unit 5 to transmit the data, one or more command buttons 6 a control screen, and a source of energy, in this case a battery 8.

The embodiment according to FIGS. 1 and 2 illustrate the different components of a printing device fixed to a printed circuit card, which simultaneously functions as a construction surface where those components are fixed. An elevation in the construction secures that the lowest surface of the printing device does not touch the area where the ink has been previously applied provided that the printing device is removed from that area.

The printing process starts with a data file containing pre-selected printing patterns, which are sent via the communication unit 5 to a data memory, for example, one which is built into the micro controller circuit 4. With the assistance of a built-in positioning sensor means 13 and one of the command buttons 6 the coordinates are indicated to an outgoing point of reference in the printing surface. One or more sources of light, for example light emitting diodes (LED), lighting up the printing frame so that the optical positioning sensor means are activated and then the forward feeding of the coordinates to the micro controller circuit can take place.

When the positioning sensor means 3 and the print head 2 are fixed in relation to each other, a geometrical construction with all the necessary parameters for a mathematical calculation of the coordinates of the print head 2 can be achieved.

The micro controller circuit 4 contains a software program, which uses the incoming data from the positioning sensor means 3 and mathematical equations to calculate in real time the coordinates for each individual ink-jet nozzle 12.

Using the measures of two coordinates establishes the required movement direction for each case. The time difference between two measurements indicates the acceleration and speed required. Simultaneously all measurements and equations are compared with the stored printing commands based upon coordinates equated from the original data file.

At this stage the micro controller circuit has sufficient information to seize a decision. On a positive indication an electric impulse is generated in the piezo- or termo-electrical micro pumps in the concerned inkjet nozzles 12, which in turn sends out ink-jet drops onto the printing surface.

The printing commands are erased after each electric impulse so that even if the inkjet nozzles coincide with the previous coordinates no ink drops are sent out to the existing print out.

Figure 3:
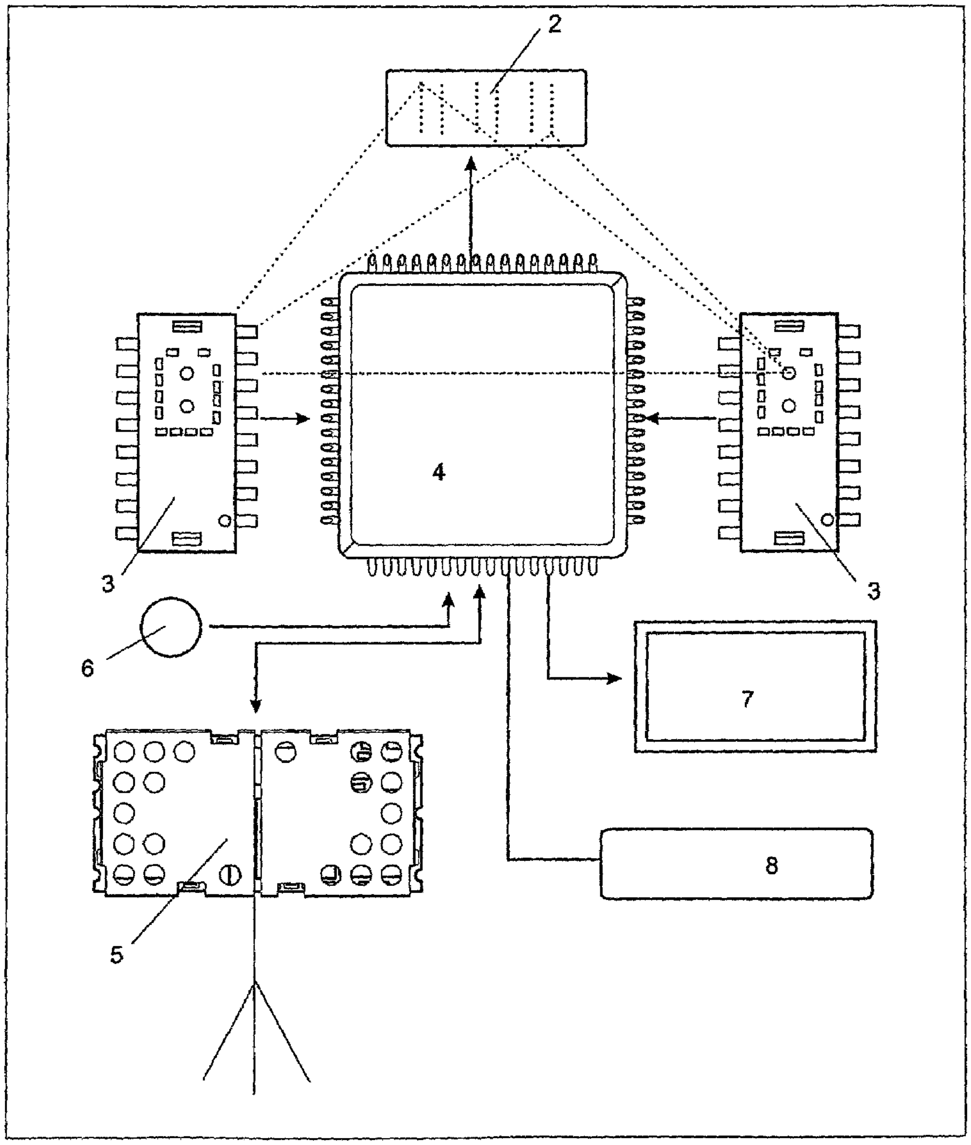
FIG. 3 illustrates a schematic view of the main components of a printing device according to FIGS. 1 and 2.

FIG. 3 illustrates how the different components of the printing device interact as well as reproduction of the geometrical forms established between the ink-jet nozzles 12 and the positioning sensor means 3.

Figure 4:
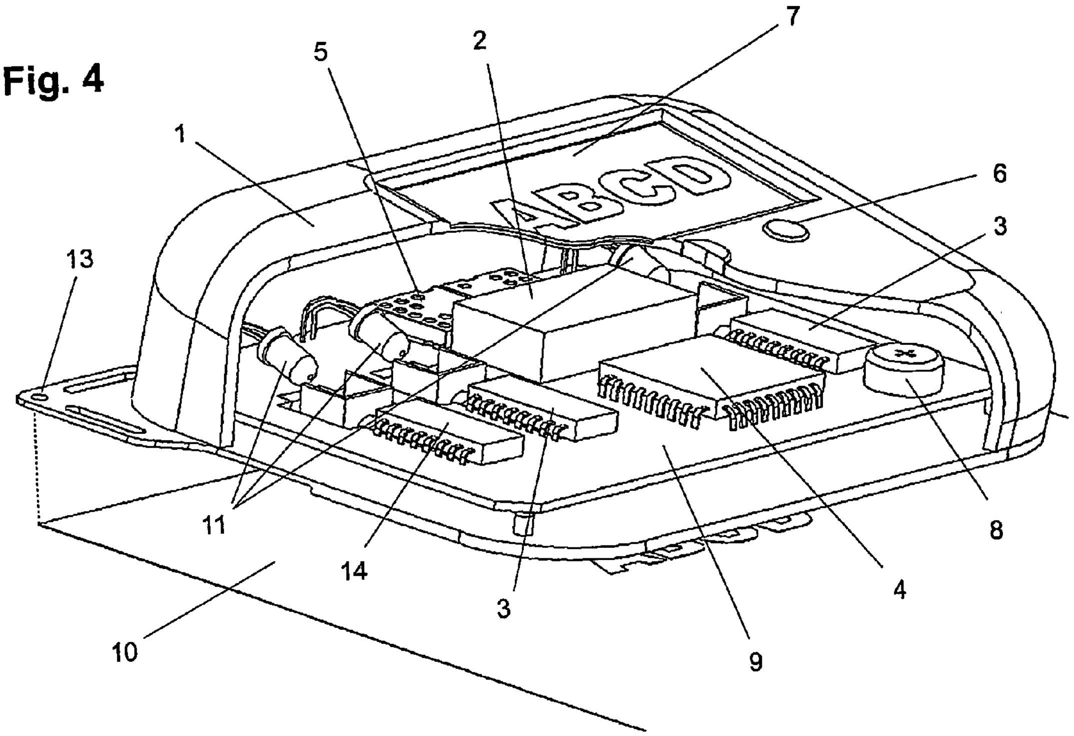
FIG. 4 illustrates a perspective view of another embodiment for a printing device that may be used in the present invention.

The embodiment according to FIG. 4 illustrates the printing device with a complementary digital camera 14, for example, such as a CCD equipped camera.

Figure 5:
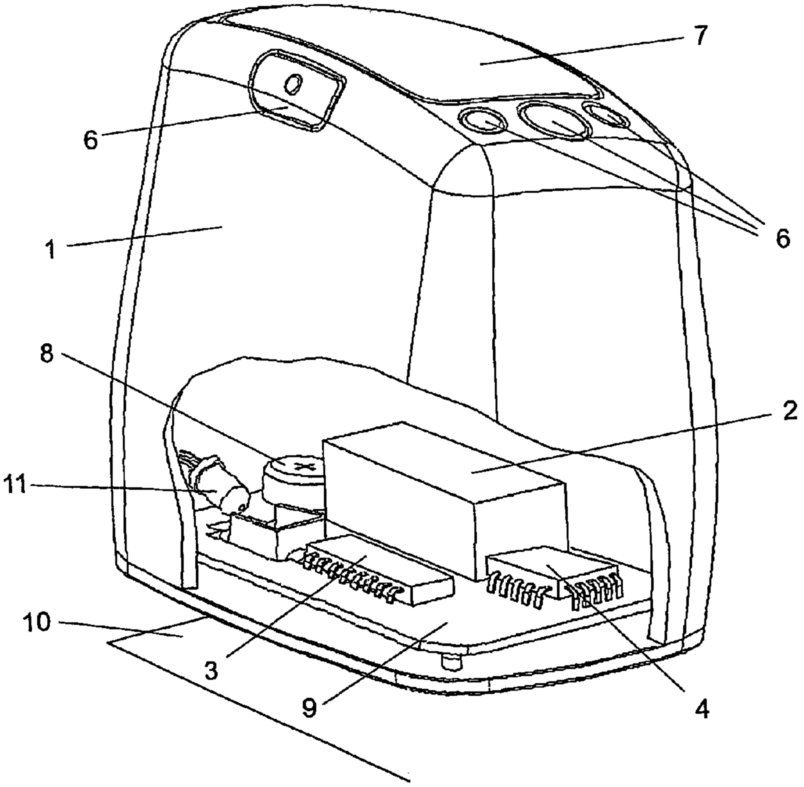
FIG. 5 illustrates a perspective view of a simpler printing device that may be used in the present invention.

FIG. 5 illustrates another embodiment for printing of smaller text quantities or graphics.

This can be considered as an electronic labeling with a pre-programmed and/or programmable electronic stamp pad.

In this embodiment only one positioning sensor means 3 is used and accordingly a simpler micro controller circuit 4 is needed, since the printing device only makes smaller and relatively straight movements.

Figure 6:
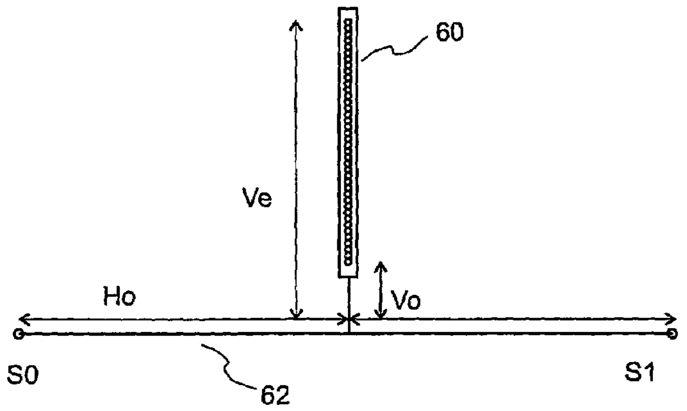
FIG. 6 schematically illustrates a sensor/print-head assembly that may be used in the present invention.

The sensor/print-head device consists of two position sensor means S0, S1 and a print head array 60 mounted together as FIG. 6 illustrates. FIG. 6 illustrates further, the two sensor means S0 and S1 in a fixed relation to a print-head array 60 with ink-jet nozzles. Ho depicts the distance from the array 60 to the sensor means S0, here Ho is the same distance to the sensor means S1. Ve and Vo, indicate the distance to the upper most and the lover nozzle in the array 60, respectively. The sensor means S0, S1 provide a signal corresponding to movements in x- and y-directions in a first coordinate system fixed to the respective sensor means S0, S1. The sensor means S0, S1 are fixed S0 that their coordinate systems are parallel to each other. Software keeps track of the assembly's position and angle relative to the paper coordinate system by integrating the movements given by the sensor means signals.

The new positions given the differential movements of sensor means S0, S1 are calculated as follows:

All position changes given in the sensor means coordinate system must be transformed to position and angle of the sensor system in a paper or other print medium coordinate system, here named as a second coordinate system. Since the distance, 2Ho, between the two sensor-means is fixed it is enough to know the position of one sensor means and the angle of the print head array relative to the second coordinate system.

Figure 7:
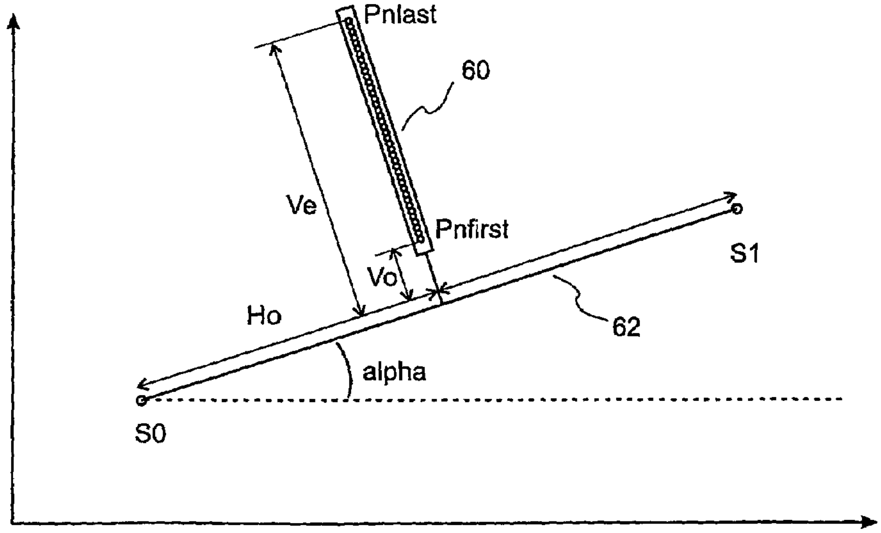
FIG. 7 illustrates a diagram with parameters used to determine the position of a sensor that may be used in the present invention.

Illustrated in FIG. 7, is a movement or navigation of the sensor print-head assembly according to FIG. 6. The array 60 has been moved or navigated an angle alpha. The upper most nozzle is depicted as Pnlast and the lower nozzle as Pnfirst, respectively, in FIG. 7. Also, the second coordinate system is depicted with the two longer arrow axis in FIG. 7.

In FIG. 7 at least one of the sensor means is assigned a first coordinate system, whereby one axis 62, preferably the x-axis, is directed through both sensor means S0, S1, and the other axis, preferably in a relation to the array 60, here in parallel to the array.

Figure 8:
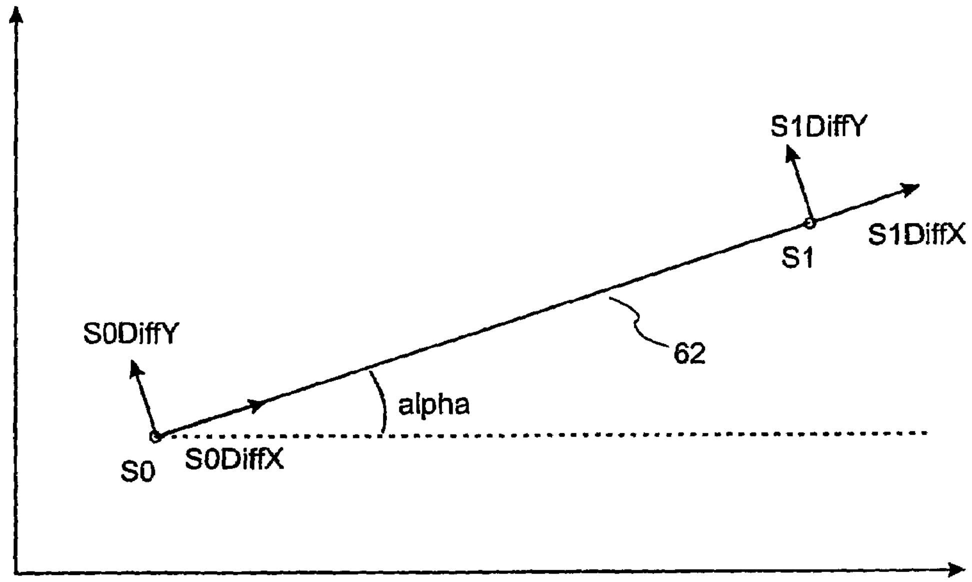
FIG. 8 illustrates a diagram with parameters for a print-head nozzle position.

In FIG. 8, the same movement as in FIG. 7 is depicted, but without the array 60. The FIG. 8 further depicts a first coordinate system on the coordinate axis 60 directed through the both sensor means S0, S1. The first coordinate system, is in this embodiment duplicated, as indicated through the arrows on the axis 62, but as the distance between both sensor means S0, S1 is fixed only one of the first coordinate systems is needed for computation.

The movement of the sensor means S0 or S1 (it does not matter which one) in the paper or print medium second coordinate system at an angle 'alpha' is calculated, in accordance with the present invention, as:

$$\text{delta}X=S\mathbf{0}\text{Diff}X^{*}\cos(\text{alpha})-S\mathbf{0}\text{Diff}Y^{*}\sin(\text{alpha})$$

$$\text{delta}Y=S\mathbf{0}\text{Diff}X^{*}\sin(\text{alpha})+S\mathbf{0}\text{Diff}Y^{*}\cos(\text{alpha})$$

Where S0DiffX and S0DiffY are the movements of the sensor means in x- and y-directions respectively, in the sensor/print-head device, named first coordinate system.

The angular change can be calculated as the difference of the sensor means y-movements in the sensor means first coordinate system multiplied by a constant that is determined from the distance between the sensor means S0, S1. To simplify, the angle is measured in units of one sensor "step" and the sine and cosine values are taken from tables that are adjusted according to this. Thus S1DiffY−S0DiffY, provides the angle change.

The movement in x-direction of sensor means S1 is not used, the information is redundant since the sensor means geometry is fixed.

When the position of one sensor means S0 or S1 and the tilt angle of the sensor/print head assembly alpha are known the positions of the print head nozzles can be calculated as follows, depicted in FIG. 7:

The positions of the first and last nozzle are calculated as:

$$PN\text{first}X=S\mathbf{0}x+Ho^{*}\text{cosine}(\text{alpha})-Vo^{*}\text{sine}(\text{alpha})$$

$$PN\text{first}Y=S\mathbf{0}y+Ho^{*}\text{sine}(\text{alpha})+Vo^{*}\text{cosine}(\text{alpha})$$

$$PN\text{last}X=S\mathbf{0}x+Ho^{*}\text{cosine}(\text{alpha})-Ve^{*}\text{sine}(\text{alpha})$$

$$PN\text{last}Y=S0y+Ho^{*}\text{sine}(\text{alpha})+Ve^{*}\text{cosine}(\text{alpha})$$

To calculate the positions of all nozzles, it is to start with the first nozzle positions and adding up the difference in x- and y-directions between the nozzles, calculated by dividing the x- and y-distance between the first and last nozzle by the number of nozzles:

$$PN(n)X=PN\text{first}X+n^{*}\text{delta}X$$

$$PN(n)Y=PN\text{last}+n^{*}\text{delta}Y$$

where deltaX=PNlastX−PNfirstY deltaY=PNlastY−PnfirstY

In accordance with the teaching it sets forth a sensor and ink-jet print-head 2 assembly comprised in a housing 1 for a hand-held and hand-operated printing device controlled by a processor 4. It thus comprises:

two position sensor means S0, S1 at least one sensor means being related to a first coordinate system, having one axis in a relation to the print-head assembly, and one axis 62 in a direction through both sensor means;

a print-head array 60 attached in a fixed position to the sensor means S0, S1;

input means 6 on the housing connected to the processor for input of control commands;

determining means for reference coordinates in a second coordinate system provided in relation to a print medium, the reference coordinates being established by a control command through the input means 6 with the thus read sensor means signals;

integrating means for keeping track of the assemblies position related to the reference coordinates in the second coordinate system by integrating displacement of the sensor means position in the first coordinate system;

computing means for transforming the sensor means S0, S1 coordinates to coordinates in the second coordinate system, whereby the assemblies position on the print medium is determined in relation to the reference coordinates.

Sensor means and print-heads that are suitable for the present invention are well known in the art and described in for example U.S. Pat. No. 5,927,872 by Yamada, U.S. Pat. No. 6,233,368 B1 by Badyal et al, and U.S. Pat. No. 5,644,139 by Allen et al. Sensor means can be bought from Agilent, www.agilent.com. Another sensor means has the product name HDNS-2000 and enables 1.500 pitures/s, the next model in progress enables 6.000 pictures/s. Sensor means in this description can comprise known means that are to cooperate together with a sensor itself, for example, LED's or only be sensors or an array of sensors.

The type of position reading sensors currently utilized in known handheld and hand-operated printing devices generally have a deviation in accuracy for positioning data of about 0.5-1%, which considerably reduces the print-out quality and the visual experience of a printed image. The human eye easily detects a gradually increasing as well as decreasing blackness in a printed image and a positional divergence of the printing device of about 0.5-1%, is clearly enough for providing either an overlap or a gap between two subsequently printed sections of an image having sides interfacing each other. The complete image, printed in sections utilizing printer-positional information as provided by the currently utilized sensors, will in some intersections therefore be either darkened due to overlapping in part of subsequently printed image sections or lightened due to a distancing between the same.

At occasions, the hand-held printing device will be positioned correctly for a subsequent sectional printout of an image, but this will be accomplished more by chance and not S0 much by accurate positioning by means of sensor data. The random and unpredictable printout quality achieved is a great setback with the former printer solutions and a need for a better product evidently emerges, preferably without interfering with the structural smallness of the hand-held printing devices as of current composition.

For printing an image in sections with a handheld and hand operated printing device (1) controlled by a processor (4), in one embodiment of the invention provided with an ink-jet print head array (2) having nozzles 12 and achieving an improved and homogeneous image-printout quality, a software solution is therefore implemented in accordance with the present invention, which in one embodiment provides a printing pattern in a transition area between associated image section sides interfacing each other during a printing sequence, when the full image is printed in subsequent sections.

A transition pattern can in one embodiment of the present invention be provided through a variable range of the outermost placed nozzle channels 12 at each end of the print head array 60 during printing in accordance to transition pixel printing instructions provided via printer-inherent software. The pixels, which are to be printed onto the print medium according to the stored pixel data through the remaining nozzle channels 12 of the array 60, are consequently printed thereon at positions corresponding to their mutually stored pixel positional coordinate data.

During a printing sequence, the printer device is swept, preferably from the left to the right and back to the left and 50 forth forming a meandering movement of the device in a downward direction on the print medium for sequentially building up a full printout of an image. Image pixels are then, in a preferred embodiment of the invention, provided as ink droplets from an ink container, printed onto the medium through for example a total of 128 nozzle channels 12 on the print head array 60 at positions thereon in accordance to previously stored image pixel coordinate data with exceptions for the respective selected number of the most distal channels on the array, omitting some of the pixels in accordance to a certain pattern for forming a visually smoothened transition area between subsequently printed image sections having interfacing sides. The 128 nozzle channels 12, in one embodiment of the invention, form a single pixel column extending in the vertical direction on the medium during printing of an image section and the pixels lying in the line of the print head array 60 are continuously selected from the memory for printing during such a sequence. The software, then through the transition pattern, which for example can be pre-stored, randomly generated or generated according to a mathematical algorithm, also controls the printing or omitting of pixels through the selected number of outermost positioned channels at each end of the print head array. The pixels are consequently only printed onto the medium through the said distal channels when both the selected memory-stored image-pixel and the corresponding pixel as of the transition pattern are present i.e. when both the corresponding pixels have a value TRUE for printing. In cases where either of the transition pattern or stored image-pixel is missing, that pixel is omitted during that printing sequence. An earlier printed pixel will not be printed again, but an earlier omitted pixel has further chances of being printed if and when the array of nozzle channels on the device is repeatedly swept across the location of such an omitted pixel on the print medium. Such a repeated sweeping of the printer can be performed for the sake of improving the pixel density of the printed image and earlier omitted pixels in transition areas can then be printed in accordance with their respective pixel coordinate data retrieved from storage in the memory. The previously printed pixels, which together form the essentially complete printout of the image, are then, in one embodiment of the invention, omitted from re-printing as their respective coordinate data are deleted from memory during their respective initial printing and that coordinate data can therefore not be referred to again for printing.

Alternatively, stored pixels, i.e. pixel data, are moved from a first memory place to a second memory place after being used in a printing sequence, for user-controlled retrieval to the first memory space again for repeated printing of the full image later.

Figure 9:
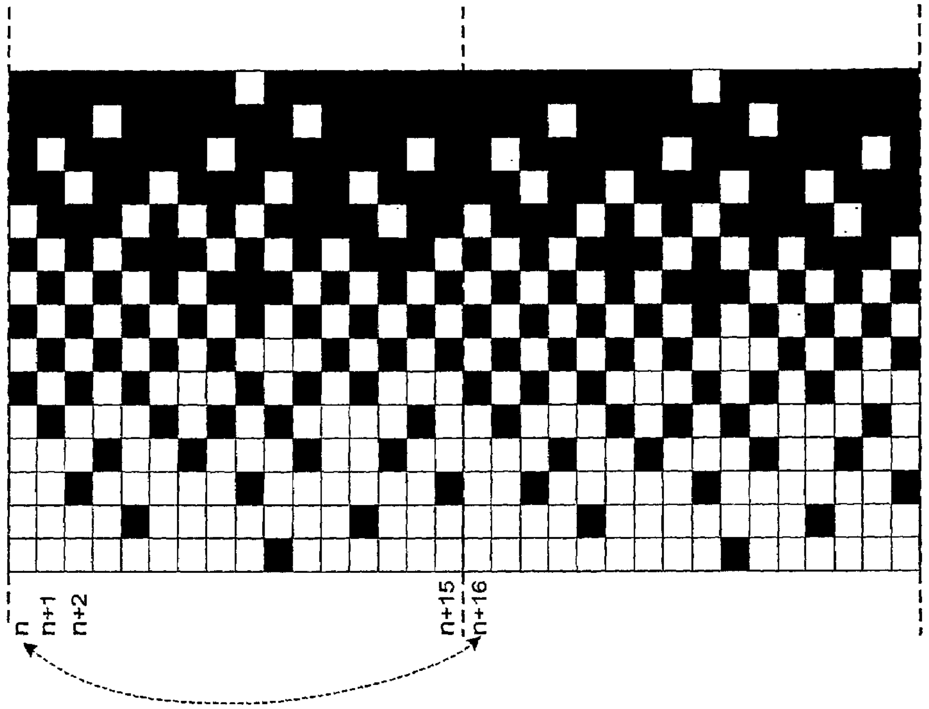
FIG. 9 illustrates one embodiment of a transition pattern for image printing in sections with a handheld and hand operated printing device in accordance with the present invention.

FIG. 9, according to one embodiment of the present invention, illustrates a pre-stored transition-printing pattern generated by the 15 outermost positioned nozzle channels 12 of the print head array 60 and is intended to appear randomly generated. The probability for printing a pixel according to this transition pattern as of columns n to n+15 decreases in each column towards the lower end thereof. In the uppermost row of pixels the probability for printing a pixel is 15/16 and the number of pixels for printing decreases linearly to a probability of 1/16 for pixel printing at the lowermost end, which represents the side interfacing a subsequent section for printing. Each of the columns n to n+15, according to the pattern, has a total of 7 or 8 pixels for printing and has a printing pattern differing from the other columns in that range. In column n, for example pixels 1-5, 7, 9 and 11, counting from the lowermost side of the column, cannot be printed and in column n+1, pixels 1-4, 6, 8, 10 and 13 cannot be printed according to the pattern. The transition pattern is then circularly repeated starting from column n+16, having an identical printing pattern as that of column n. During a printing sequence, all pixels in a single or multiple transition pattern column, for example column n or columns n and n+1, are printed simultaneously given that the requisites for pixel printing are fulfilled, as being part of a total of 128 pixels for printing simultaneously by the single or multiple row nozzle channels 12 of the print head array 60.

Figure 10:
FIGS. 10 and 11 respectively shows the same image, printed in sections with and without using a transition pattern in accordance with the present invention.
Figure 11:

FIGS. 10 and 11 respectively show two printouts of the same image, both printed in sections with a handheld and hand-operated printer. FIG. 10 depicts the image printed without using a transition pattern and interfacing image section sides of the printout then suffering from poor quality in the transition areas. FIG. 11 depicts the image printed utilizing a transition pattern in accordance with the present invention and the transition areas between subsequently printed image sections are then hardly discernible, the transition pattern thus allowing for a high quality printing with such handheld and hand-operated printers despite positional deviation of the device on the printing medium due to inaccurate data from the printer sensors during a printing sequence.

In one embodiment of the present invention, the 5-20 outermost positioned nozzle channels at each end of the array are arranged to provide the transition pattern.

In another embodiment of the present invention, a pixel is omitted from printing within the transition area when one of an memory-stored image-pixel and the corresponding pixel as of the transition pattern have a value FALSE for printing, i.e. when only one of the selected memory-stored image-pixel and the corresponding pixel as of the transition pattern are present.

In embodiments of the present invention, an ink-jet print head with an associated ink container has been mentioned. However, the invention should not be limited to ink-jet print heads only, on the contrary, the principle described could be applicable on other types of print heads as well.

It is appreciated that the means used in the present invention are hardware means or software means or a combination of both.

The present invention is not restricted to given embodiments or examples, but the attached set of claims define other embodiments for a person skilled in the art.

The invention claimed is:

1. A hand-held and hand-operated random movement-printing device controlled by at least one processor, and having a print head assembly comprised in a housing, further comprising:

at least one position sensor means, sensing the position of the printing device on a print medium in relation to pixels to be printed;

a memory, storing at least one image with its mutual image pixel coordinate data;

a print-head array provided with nozzles, for printing image pixels onto the print medium in accordance with the pixel coordinate data during a printing sequence; wherein the image being built-up through sectional printing whereby each section has at least one print area interfacing at least one other print area, said interfacing print areas being correlated to fill-out transition print areas during printing of said sections through at least one transition printing pattern by omitting printing of some pixels in said transition print area.

2. A printing device according to claim 1, wherein said omitted pixels in said transition area according to said printing pattern are randomly distributed.

3. A printing device according to claim 1, wherein said omitted pixels in said transition area according to said printing pattern are distributed according to a mathematical algorithm.

4. A printing device according to claim 1, wherein said omitted pixels in said transition area are distributed according to a pre-stored printing pattern.

5. A printing device according to claim 1, wherein the probability of a pixel being printed within the transition area of an image section is decreasing towards that peripheral side of the transition area facing a side of an image section for subsequent printing.

6. A printing device according to claim 1, wherein a pixel is printed within the transition area when both the image-pixel and the corresponding pixel of the transition pattern have a value TRUE for printing.

7. A printing device according to claim 1, wherein a pixel is omitted within the transition area when one of an image-pixel and the corresponding pixel of the transition pattern have a value FALSE for printing.

8. A printing device according to claim 1, wherein a variable range of the outermost positioned nozzles in the array are arranged to provide the transition pattern.

9. A printing device according to claim 1, wherein the 5-20 outermost positioned nozzles at each end of the array are arranged to provide the transition pattern.

10. A printing device according to claim 1, wherein the transition pattern provides a gradually decreasing probability of pixel printing the further out the nozzles are located at each end of the array.

11. A printing device according to claim 1, wherein an earlier omitted pixel is printed during a re-printing sequence of the same image and an earlier printed pixel is omitted from re-printing.

12. A printing device according to claim 1, wherein the print head is of the ink-jet type having nozzle channels, arranged for spraying ink droplets from an associated ink container onto the print medium in accordance with the pixel coordinate data.

13. A method for a hand-held and hand-operated random movement-printing device controlled by at least one processor, and having a print head assembly comprised in a housing, comprising the steps of:

sensing the printing device position on a print medium in relation to pixels to be printed;

storing at least one image with its mutual image pixel coordinate data in a memory;

printing image pixels through nozzles a print-head array onto the print medium in accordance with the pixel coordinate data during a printing sequence; wherein the image being built-up through sectional printing whereby each section has at least one print area interfacing at least one other print area, said interfacing print areas being correlated to fill-out transition print areas during printing of said sections through at least one transition printing pattern by omitting printing of some pixels in said transition print area.

14. A method according to claim 13, wherein said omitted pixels in said transition area according to said printing pattern are randomly distributed.

15. A method according to claim 14, wherein said omitted pixels in said transition area according to said printing pattern are distributed according to a mathematical algorithm.

16. A method according to claim 15, wherein said omitted pixels in said transition area are distributed according to a pre-stored printing pattern.

17. A method according to claim 13, wherein the probability of a pixel being printed within the transition area of an image section is decreasing towards that peripheral side of the transition area facing a side of an image section for subsequent printing.

18. A method according to claim 13, wherein a pixel is printed within the transition area when both the image-pixel and the corresponding pixel of the transition pattern have a value TRUE for printing.

19. A method according to claim 13, wherein a pixel is omitted within the transition area when one of an image-pixel and the corresponding pixel of the transition pattern have a value FALSE for printing.

20. A method according to claim 13, wherein a variable range of the outermost positioned nozzles in the array provide the transition pattern.

21. A method according to claim 13, wherein the 5-20 outermost positioned nozzles at each end of the array provide the transition pattern.

22. A method according to claim 13, wherein the transition pattern provides a gradually decreasing probability of pixel printing the further out the nozzles are located at each end of the array.

23. A method according to claim 13, wherein an earlier omitted pixel is printed during a re-printing sequence of the same image and an earlier printed pixel is omitted from re-printing.

24. A method according to claim 13, wherein the print head is of the ink-jet type having nozzle channels, for spraying ink droplets from an associated ink container onto the print medium in accordance with the pixel coordinate data.

* * * * *